United States Patent [19]

Smith

[11] Patent Number: 5,606,593
[45] Date of Patent: Feb. 25, 1997

[54] APPARATUS AND METHOD FOR AUTOMATICALLY RETURNING A TELEPHONE SET TO AN ON-HOOK CONDITION

[75] Inventor: David B. Smith, Hinsdale, Ill.

[73] Assignee: Lucent Technologies Inc., Murray Hill, N.J.

[21] Appl. No.: 342,187

[22] Filed: Nov. 18, 1994

[51] Int. Cl.[6] .................. H04M 3/22; H04M 15/00; H04M 1/00; H04M 3/00

[52] U.S. Cl. .................. 379/33; 379/32; 379/130; 379/131; 379/177; 379/184; 379/190; 379/161; 379/162

[58] Field of Search .................. 379/32, 33, 177, 379/184, 161, 162, 190, 194, 195, 377, 387, 130, 131

[56] References Cited

U.S. PATENT DOCUMENTS

| 4,273,960 | 6/1981 | Fahey | 179/5 R |
|---|---|---|---|
| 4,686,697 | 8/1987 | Shapiro | 379/27 |
| 4,903,291 | 2/1990 | Tsurufuji | 379/88 |
| 4,922,529 | 5/1990 | Kiel | 379/377 |
| 4,998,271 | 3/1991 | Tortola | 379/32 |
| 5,142,572 | 8/1992 | Hopkins | 379/393 |
| 5,263,081 | 11/1993 | Nightingale | 379/377 |
| 5,390,249 | 2/1995 | Paek | 379/387 |

Primary Examiner—Wellington Chin
Assistant Examiner—Vijay Shankar
Attorney, Agent, or Firm—Jack R. Penrod

[57] ABSTRACT

An apparatus that after a time period settable by the user automatically returns an off-hook telephone to an on-hook condition. This apparatus thus electrically hangs up a telephone handset that is inadvertently left off-hook and allows normal handling of outgoing and incoming calls at other telephone extensions and in some embodiments, even allows calls to ring-in to the telephone having the inadvertently off-hook handset. The apparatus also senses when the inadvertently off-hook handset is returned on-hook and rapidly restores the automatic-return-to-an-on-hook condition switch to normal operation.

3 Claims, 6 Drawing Sheets

APPARATUS AND METHOD FOR AUTOMATICALLY RETURNING A TELEPHONE SET TO AN ON-HOOK CONDITION

TECHNICAL FIELD

The present invention relates to telephone equipment and more particularly to telephone equipment which automatically returns to an on-hook condition even if its handset is physically off-hook.

DESCRIPTION OF THE PRIOR ART

Standard telephone sets all have the problem that they may inadvertently be left off-hook. This often occurs for many different reasons. For example, a user while conversing at one extension telephone in one room often leaves that extension off-hook to get something in a second room and then continues the conversation on another extension telephone in the second room and after the extension telephone in the second room is returned to the on-hook condition at the end of the conversation the extension in the first room is frequently inadvertently left off-hook. Another common example occurs when a user does not place the handset squarely in the on-hook position causing the user's telephone to remain in the off-hook condition. A third example occurs when a handset is knocked off its hook-switch and left by a household member or a household pet. Whenever a standard telephone is left off-hook, normal telephone calls cannot be originated or received until the telephone which was inadvertently left off-hook is returned to an on-hook condition. This problem is compounded if there are multiple extensions to one line because none of the extensions may be used until the one extension that was left in the off-hook condition is returned to the on-hook condition.

A telephone that is left off-hook is also a problem to its local telecommunication switch because after a few minutes the switch stops polling for the first character or number and shifts instead to a special program that performs a different, slower polling for sensing a return of the telephone to an on-hook state.

U.S. Pat. No. 4,903,291 issued Feb. 20, 1990 to Tsurufuji et al. discloses an automatic on-hook arrangement which monitors the output of the microphone of the telephone to determine if a user is speaking into the microphone. If the user does not speak into microphone for a long period of time, then the arrangement of this patent automatically returns the telephone set to an on-hook condition. This arrangement requires a speech detector and at least one timer. Further, it would not be effective if a high audio level of human speech activity was occurring near the microphone whether a telephone conversation was taking place or not. Loud voices could be erroneously interpreted by this arrangement as an active telephone conversation and thus not an inadvertent off-hook condition of a telephone set.

U.S. Pat. No. 4,922,529 issued May 1, 1990 to Kiel discloses an automatic hang-up apparatus for restoring service to off-hook telephones. The Kiel apparatus monitors for: a characteristic howler tone sent by a local telecommunication switch to warn the telephone customer that his or her telephone is off-hook, a long period of silence where there is no dial tone or similar telephone signal indicative of an active telephone call, or no movement of a handset for a time, which is determined by a motion sensor in such a device. The occurrence of any of these is considered an inadvertent off-hook state and the apparatus automatically hangs up, i.e., goes to an on-hook condition. This apparatus requires an off-hook sensing circuit and a howler tone sensing system, a silence sensing system including some type of timer circuit, a dial tone sensing system and some type of timer circuit, or a motion sensing system and a timer. A motion detecting sensor and its supporting circuits would typically add a high degree of expense to a handset and the sensor itself would have to be rugged because handsets are often dropped. The other circuits of the Kiel patent are audio sensor circuits of some type, narrow band or broad band, which are used in conjunction with some type of timing circuit, either an explicit timer or an implicit integration-over-time-circuit. These circuits all add complexity to a telephone and as the Kiel patent points out, all have drawbacks.

The dial-tone sensing system and timer might be falsely triggered by a user that habitually picks up the handset while looking up a telephone number. The silence sensing system might be falsely triggered while a user is waiting on hold and annoyingly disconnected. The howler tone sensing system preferred by Kiel would hang up an off-hook telephone upon receipt of the howler tone, which usually occurs approximately one minute after a handset goes off-hook without any dialing activity, or approximately three minutes after the other party or parties to a call have all hung up and the call has been torn down by the local telecommunication switch. Thus, the howler tone sensor does not provide the user the capability to have a telephone off-hook for privacy or concentration for more than three or four minutes.

It is an object of the present invention to provide a device for returning a telephone set in an inadvertent off-hook condition to an on-hook condition after a user determined length of time.

It is an object of the present invention to provide a simple, straight forward device for returning a telephone set in an inadvertent off-hook condition to an on-hook condition such that subsequent telephone calls will ring in.

SUMMARY OF THE INVENTION

Briefly stated, in accordance with one aspect of the invention, the aforementioned objects are achieved by providing an apparatus which automatically returns a telephone to an on-hook condition after the handset of the telephone has been off-hook for a predetermined time period. This pre-determined time period is settable by the telephone user by means of a keypad or dial. The user sets the time period and a timer starts the timing whenever the hook-switch is in an off-hook position. This could because of a normal call or because someone knocked the handset off the hook-switch. In either case, when the time period is reached, an automatic-return-to-an-on-hook-condition switch is actuated and the telephone is returned to an on-hook condition, which is almost equivalent to the handset being physically placed in the on-hook position. The automatic-return-to-an-on-hook-condition switch when actuated after the user determined period of time allows an incoming call to ring-in, even though one handset is inadvertently left off-hook.

In accordance with one aspect of the invention, the aforementioned problems are solved and the objects achieved by providing an apparatus which is internal to a telephone which automatically returns a telephone to an on-hook condition after the handset of the telephone has been off-hook for a pre-determined time period. This pre-determined time period is settable by the telephone user by means of a keypad and DTMF tones. The user sets the time period and a timer starts the timing whenever the hook switch is in an off-hook position. The handset could be off-hook because of a normal call or because someone knocked the handset off the hook-switch. In either case, when the timer has reached the end of the time period, an automatic-return-to-an-on-hook-condition switch is actuated and the telephone returned to an on-hook condition, which is almost equivalent to the handset being in the actual on-hook position. The automatic-return-to-an-on-hook-condition switch may be mechanically coupled to the hook-switch such that the hook-switch may be physically returned to the on-hook position as well as the on-hook condition. The automatic-return-to-an-on-hook-condition switch when actuated allows an incoming call to ring-in, even though one handset is inadvertently left off-hook. The apparatus may further include an alerting device which alerts the user that the pre-determined time period before automatic return to an on-hook condition is almost over. The alerting device provides a user sufficient time to bring a conversation to an end or to re-set the time period before automatic return to an on-hook condition.

In accordance with another aspect of the invention, the aforementioned problems are solved and the objects achieved by providing an apparatus which is external to a telephone which automatically returns a telephone to an on-hook condition after the handset of the telephone has been off-hook for a pre-determined time period. This pre-determined time period is settable by the telephone user by means of a keypad and DTMF tones. The user sets the time period and a timer starts the timing whenever the hook switch is in an off-hook position. The handset could be off-hook because of a normal call or because someone knocked the handset off the hook-switch. In either case, when the timer has reached the end of the time period, an automatic-return-to-an-on-hook-condition switch is actuated and the telephone returned to an on-hook condition, which is almost equivalent to the handset being physically placed in the actual on-hook position. The automatic-return-to-an-on-hook-condition switch is electrically in series with the telephone and when actuated open circuits the telephone line to the telephone with the off-hook handset. The automatic-return-to-an-on-hook-condition switch when actuated allows an incoming call to ring-in on other extensions, if any, and to an external ringer within the automatic-return-to-an-on-hook condition apparatus, even though one handset is inadvertently left off-hook. The apparatus may further include an alerting device which alerts the user that the pre-determined time period before automatic return to an on-hook condition is almost over. The alerting device provides a user sufficient time to bring a conversation to an end or to re-set the time period before automatic return to an on-hook condition. The external automatic return to an on-hook condition apparatus may be provided in a one-per-extension arrangement or in an all extensions arrangement.

In accordance with yet another aspect of the invention, the aforementioned problem is solved and the objects achieved by providing a method that includes the step of receiving a return-to an-on-hook condition command by a return-to on-hook condition apparatus. The apparatus takes the next step of decoding the command, and returning to an on-hook condition its respective telephone which has a handset in an off-hook position in response to the command.

DETAILED DESCRIPTION

The present invention of an apparatus for returning a telephone set to an on-hook condition has two embodiments. The first embodiment is an apparatus which is located within a telephone set. The second embodiment is an apparatus which is located external to a telephone set. The second embodiment also has two possible versions: an all-extensions version, where one apparatus provides the return to on-hook condition for all telephone sets connected to the telephone line; and a one-per-telephone set version, where each telephone set has a respective return to on-hook condition apparatus. Each of the embodiments has its advantages.

Figure 1:
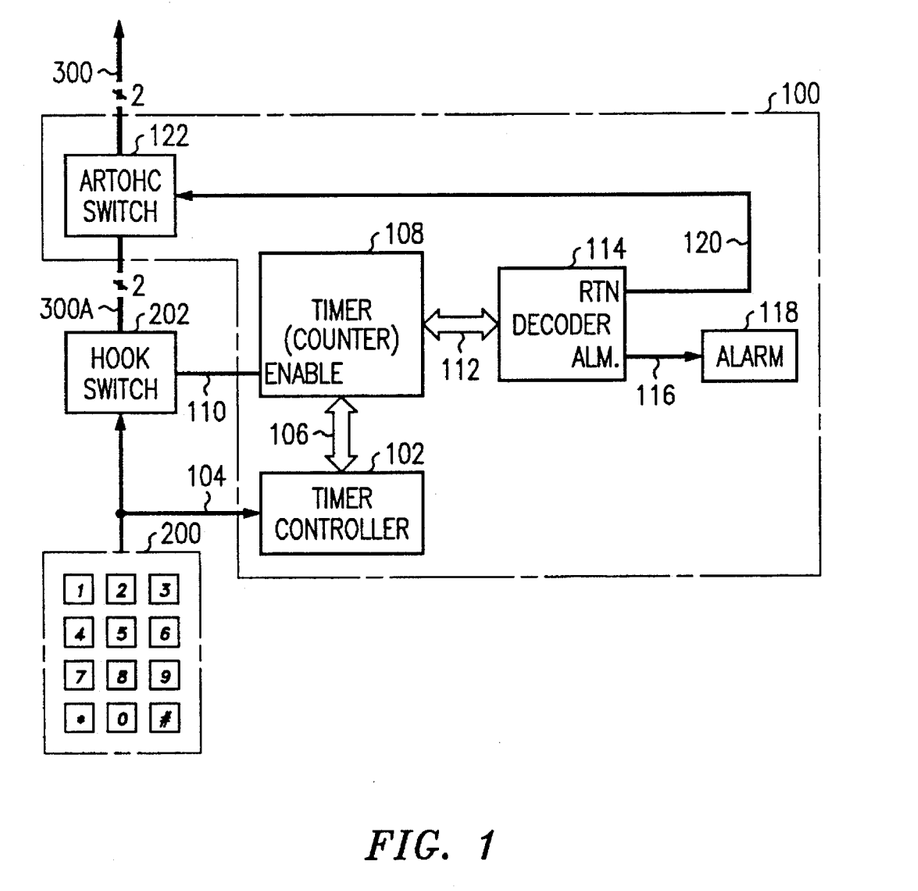
FIG. 1 is a block diagram of an apparatus for automatically returning a telephone set to an on-hook condition.

Referring now to FIG. 1, a block diagram of an automatic return to on-hook condition (ARTOHC) apparatus 100 according to the present invention is shown. ARTOHC apparatus 100 has a timer controller 102, which is connected via line 104 to a keypad 200 or similar device for manually entering digits representing a time period that is the maximum period of off-hook use. This time period may be revised and/or restarted as will be explained below. Preferably, keypad 200 is of the type that have standard dual tone multiple frequency (DTMF) oscillators built-in. Timer controller 102 is also connected via bus 106 to timer 108. Timer 108 has an internal oscillator or uses the clock oscillator of the timer controller 102 which it divides down for use as a time base. Timer 108 has an input controlling asynchronous load capability. Timer controller 102 uses the asynchronous load capability to load into timer 108, a binary number which represents the maximum time period of off-hook use.

In order to set a maximum time period of off-hook use, a user keys in a special sequence on the keypad 200, for example #$D_2D_1D_0$ where the pound sign (#) is a special character of the 12 button keypad and $D_0$–$D_2$ are selections from digits 0–9. This special sequence is converted, i.e. encoded, into a sequence of DTMF signals that are carried by line 104 to timer controller 102. Timer controller 102 receives the sequence of DTMF signals and decodes them into a command to set the maximum time period of off-hook use to $D_2D_1D_0$ time units. If the time units are minutes, the greatest maximum time period of off-hook use would be 999 minutes (16 hours, 39 minutes). Timer controller 102 converts this decimal number into a binary number. After this set command is decoded and converted, timer controller asynchronously loads the binary representation of the maximum off-hook time period into the timer 108. Preferably, this binary representation is loaded in as a maximum count and the timer 108 subsequently counts down to zero as the end point of the time period, although a timer 108 which uses an up-counter is considered to be a minor modification that is within the scope of the present invention. This setting of the time period may be performed at anytime, before, during or after a telephone call. If the setting occurs during a telephone call, it is actually a resetting of the time period, as will be explained further below.

Figure 2:
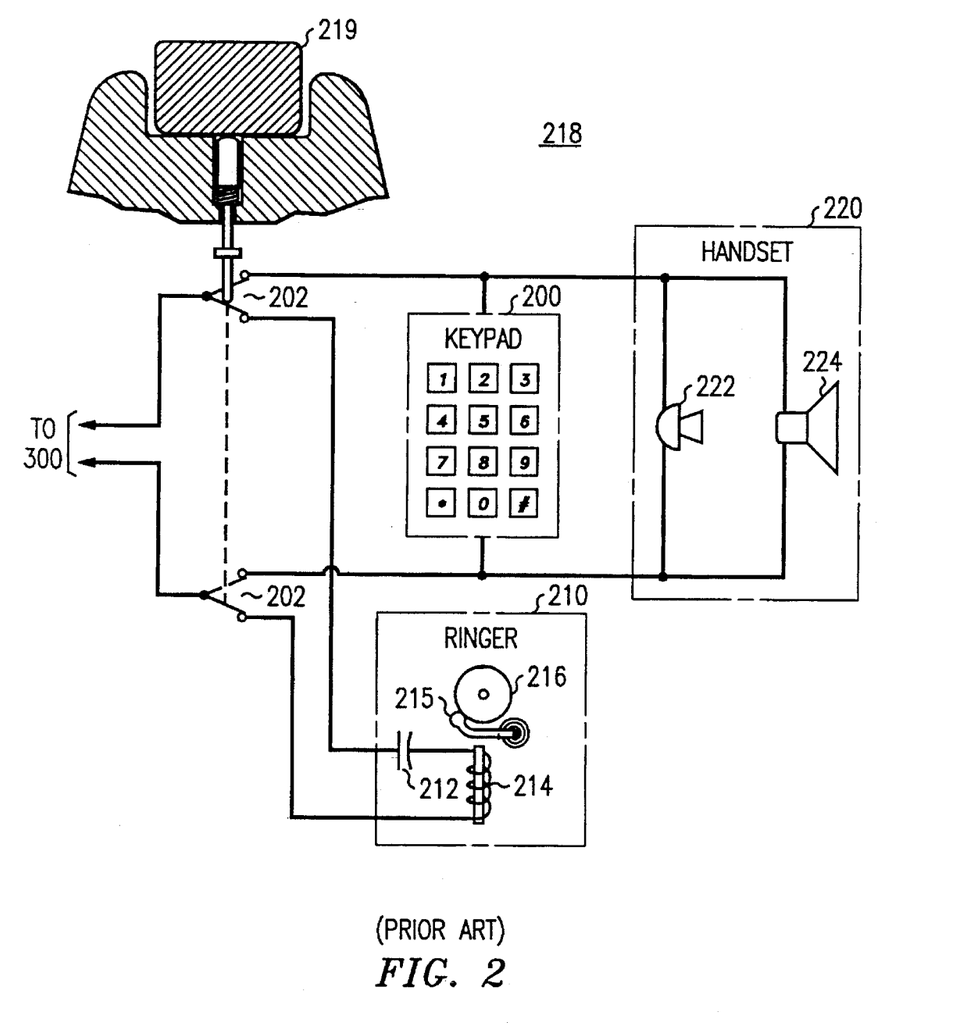
FIG. 2 is a simplified schematic diagram of a standard telephone with a keypad.

Timer 108 is also connected via line 110 to a hook-switch 202, which is a spring loaded, multi-pole-two position electrical switch or an electronic version of such a switch. Every standard telephone set has a hook-switch. The two positions of hook-switch 202 are on-hook and off-hook. FIG. 2 illustrates a hook-switch 202 of a standard base-and-handset telephone set 218 (only partially shown) and the three circuits that hook-switch 202 switches is connected to in its various states. The three circuits are a ringer circuit 210, a keypad circuit 200 (or a corresponding pulse dial circuit, not shown) and a voice circuit 220. Hook-switch 202 is shown in the on-hook position. In the on-hook position, the ringer circuit connected to two wire telephone line 300, and the keypad 200 and voice circuit 220 are disconnected from the telephone line 300. When telephone line 300 is not carrying an active call, it is usually charged with a dc voltage. Ringer circuit 210 has a capacitor 212 in series with an electro magnet 214. Capacitor 212 blocks any dc current from flowing through the electro-magnet 214 when hook switch 202 is in the on-hook position. Capacitor 212 does not block the ac ringing voltage that is superimposed on the dc voltage when a call is directed to the telephone set 218. This allows alternating and/or pulsating current to pass through electro magnet 214 to move clapper 215 and ring bell 216. However, if a user of the telephone set 218 lifts the handset 219, either in response to a ringing to answer an incoming call or to start an outgoing call, hook-switch 202 moves to the off-hook position. In the off-hook position, keypad circuit 200 and voice circuit 220 are connected to telephone line 300 and ringer circuit 210 is disconnected. That is why a telephone stops ringing when the answering party picks up the handset. The ringer circuit of a telephone set cannot operate with its hook-switch in the off-hook position.

In the off-hook position, voice circuit 220 has a microphone 222, such as a carbon microphone or an equivalent connected in parallel with an earphone 224, such as an electro-magnetic earphone or an equivalent. These are shown schematically to enhance understanding, but physically these elements would be part of the handset 219. Voice circuit 220 does not have a dc blocking element, which means that dc current will flow through voice circuit 220. As hook-switch 202 moves to the off-hook position, the local telecommunications switching system (not shown) senses that dc current begins to flow and sends a dial tone, if the hook-switch 202 is not lifted in response to an incoming call, or completes the set up of an incoming call if such a call is pending. Thus, voice circuit 220 provides a dc current load to the local switching system whenever hook-switch 202 is in the off-hook condition.

As mentioned above, when hook-switch 202 is moved to the off-hook position not in response to an incoming call, the local switching system senses the dc current flow and sends a dial tone, but the local switching system also allocates a portion of its system resources in anticipation of receiving a number and setting up an outgoing call. If the handset 219 is knocked-off inadvertently and left unnoticed, these resources of the local switching system will be inefficiently allocated. The local telephone company recognizes this, and therefore the dial tone will only be sent and the resources allocated for only so long without use. Typically after approximately 30 seconds of dial tone without a DTMF tone or a dial pulse, a pre-recorded message offering assistance and requesting the user hang up (i.e., go to on-hook position) is played for another 30 seconds. After the recorded message, approximately two minutes of a loud alert sound, sometimes referred to as a howler tone, is sent in an attempt to catch the attention of anyone nearby to encourage him or her to hang-up the telephone. After approximately two minutes of the howler tone, the line is placed in a special status during which a reduced amount of current is sent to the telephone line 300 and no dial tone will be sent until the reduced current is stopped as by a blocking capacitor. The local switch monitors telephone line 300 periodically to sense if the current has stopped. If such a stopped current is sensed by the local switching equipment, line 300 will be returned to its normal status. A similar sequence occurs if one party hangs up and the other party does not hang up after a telephone conversation is over. This often occurs when multiple extensions are used during a call. The local switch will sense one party hanging up and wait for the second party to hang up. If the second party does not hang up, the call is timed out and torn down anyway. At this point the off-hook telephone set will receive a dial tone, the prerecorded message offering assistance and requesting the user to 'please hang-up', the howler tone, and the change to a special status, as the previous inadvertent knocked off-hook situation. While listed in the special status, incoming telephone calls will not be completed by the local telecommunication switch and thus cannot be answered.

Referring back to FIG. 1, timer 108 of ARTOHC apparatus 100 is connected via line 110 to hook-switch 202 such that timer 108 starts counting down to zero from the user set time period whenever the hook-switch 202 is moved to the off-hook position. The outputs of the timer 108, which correspond to the number of time units left to count off, is connected via bus 112 to decoder 114. Decoder 114 monitors the present count of timer 108 as it counts down and looks for two specific counts. The first specific count for which decoder 114 is watching, corresponds to a short period of time before the end of the time period is reached. At this first specific time, an alarm enable signal is transmitted along line 116 to alarm 118. This alarm enable signal triggers an alarm which is to warn a user that the set time period has almost lapsed. The alarm may be audible, it may be visible or it may be both. An audible message may even be connected to earphone 224 (shown in FIG. 2) similar to the way call waiting signals are connected. The visible alarm could be a lamp that lights or changes color as the response of the alarm 118 to the alarm enable signal. This warning approximately five minutes before the end of the user set time period gives the user enough time to reset the time period using the special sequence again, or to finish up the conversation and say good-bye.

Decoder 114 also monitors timer 108 for a zero count, which means that the entire user set time period has been counted off. When decoder 114 detects the zero count, it transmits an automatic return to on-hook condition (ARTOHC) signal via line 120 to ARTOHC switch 122. ARTOHC switch 112 is a two pole, two position switch which is connected between the hook-switch 202 and the telephone line 300 as shown in FIG. 3.

Figure 3:
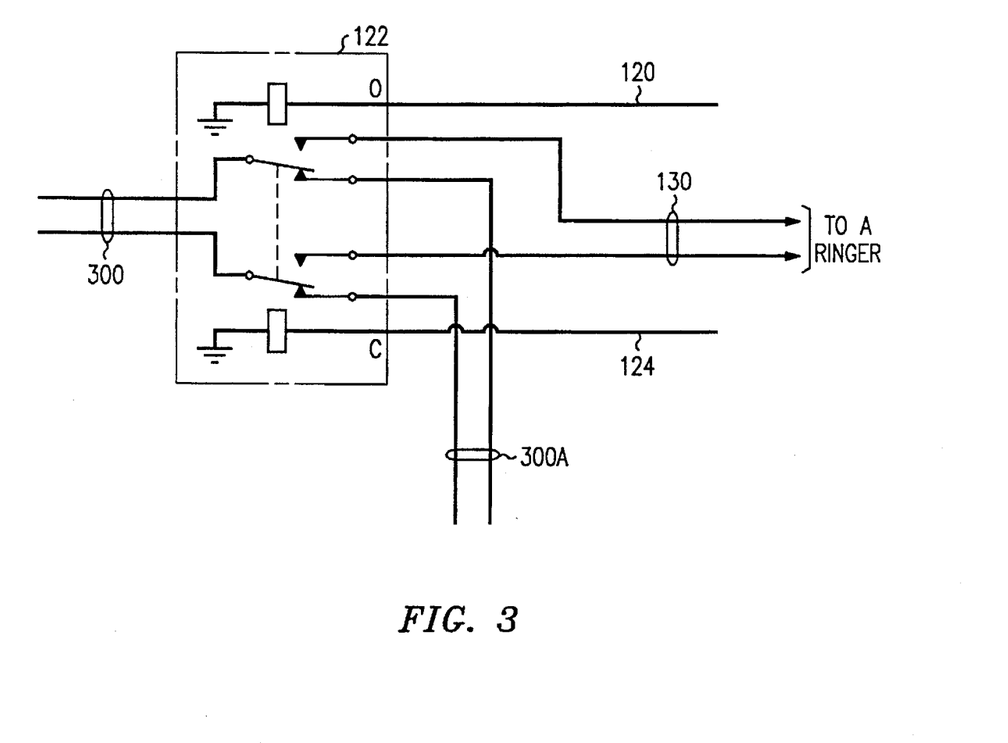
FIG. 3 is a schematic diagram of the connections of an automatic return to an on-hook condition switch.

FIG. 3 shows a relay type of switch that is normally closed such that the twisted pair of wires of telephone line 300 are normally connected to the twisted pair of wires of intermediate line 300A and hook switch 202. Other equivalent switches, such as solid state switches or solid state relays could be used instead. A latching type is preferred to save power. The operation of ARTOHC switch 122 is straightforward, when the user set time period is over, ARTOHC switch 122 opens up and the circuits of telephone set 218 are disconnected from the telephone line 300. This action will put an open circuit in front of hook-switch 202 that was inadvertently left in the off-hook position. As far as the local switching system is concerned, this action is a return to an on-hook condition, i.e. the dc current is blocked, and this causes the local telecommunication switch to change the status of telephone line 300 to normal. If telephone set 218 is only one of two or more extensions, the automatic return to an on-hook condition switch 122 and the return of the line 300 to normal status by the local telecommunication switch means that the other extensions are available to accept incoming calls, where without ARTOHC apparatus 100 and especially the operation of ARTOHC switch 122, these other extension telephone sets (not shown) would be unavailable to incoming calls. For an embodiment that will even ring in when ARTOHC switch 122 is in the ARTOHC position, the normally open contacts of ARTOHC switch 122 are connected through a pair of wires 130 to a ringer circuit, such as ringer circuit 210 (shown in FIG. 2).

Figure 4:
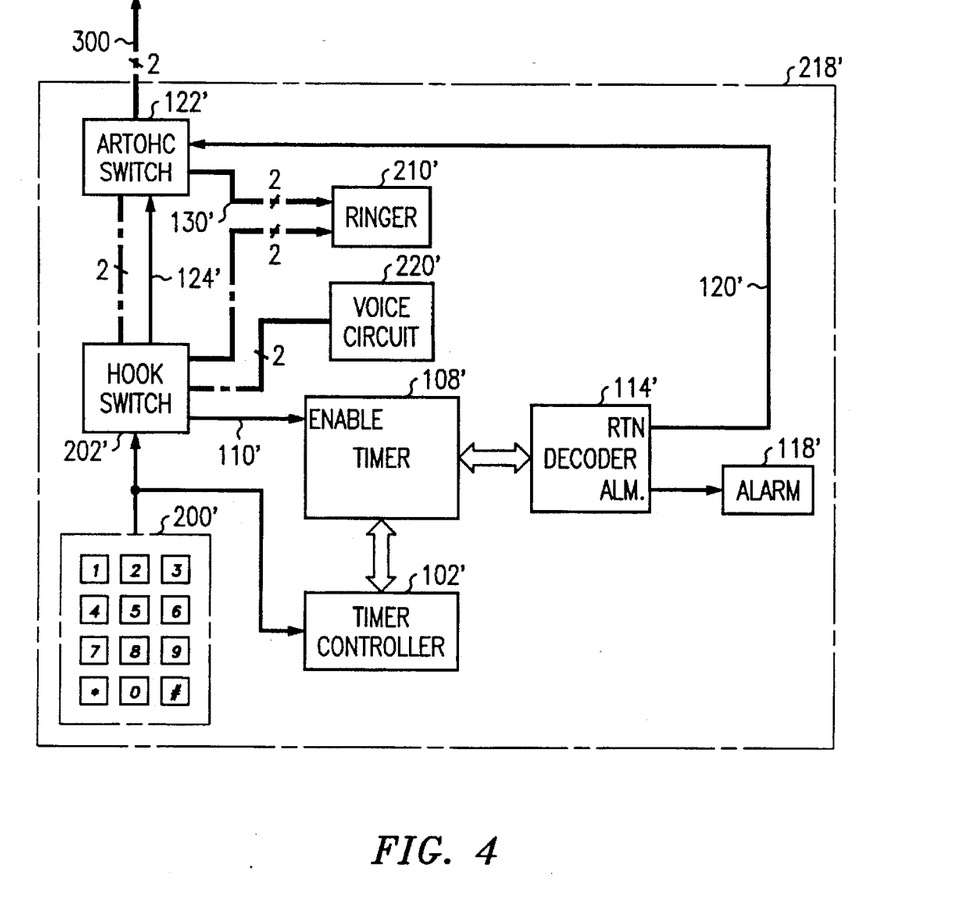
FIG. 4 is a block diagram of an internal-to-a-telephone embodiment of the present invention.

Referring now to FIG. 4, an embodiment which has ARTOHC circuit manufactured as part of a telephone set 218' is illustrated. The similar numbers between FIGS. 1, 2, 3 and 4 designate similar elements. Elements 102' to 124' and 200' to 202' are equivalent to elements 102 to 124 and 200 to 202 of FIGS. 1–3, the difference being that the designations that are primed (') are in a new combination to make up the new telephone set 218'. The ARTOHC circuit of elements 102' to 124' operates essentially the same as ARTOHC circuit 100 described previously. The main advantages of the arrangement shown in FIG. 4 are that keypad 200' is always connected to timer controller 102' so the setting sequence may be entered anytime, ringer circuit 210' is connected and will ring when ARTOHC switch 122' is in the ARTOHC position, and hook-switch 202' is coupled via line 124' to ARTOHC switch 122' such that when hook-switch 202' is physically returned to the on-hook position, ARTOHC switch 122' is switched to the normally closed position to restore normal operation completely. Alternatively, instead of the electrical coupling and switching of ARTOHC switch 122' shown in FIG. 4, a mechanical linkage (not shown) could be used such that the mechanical act of hanging up handset 119' would not only move hook-switch 202' to the on-hook position, but also move ARTOHC switch 122' to its normally closed position if it was open.

Figure 5:
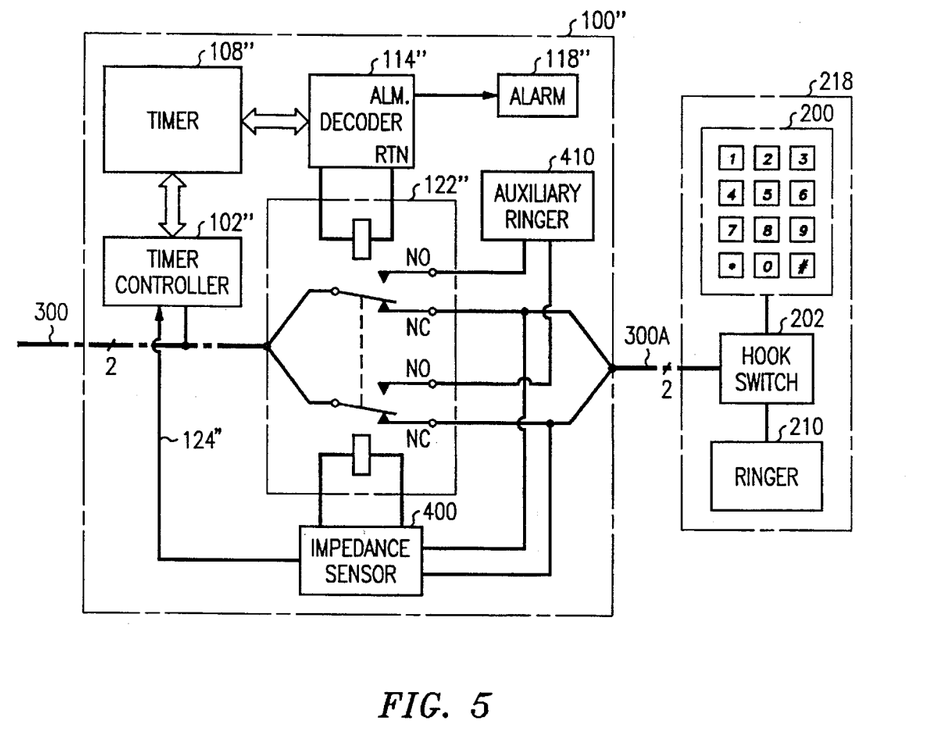
FIG. 5 is a simplified schematic diagram of an external-one-per-extension embodiment of the present invention.

Referring now to FIG. 5, an embodiment that has one ARTOHC circuit inserted between each telephone set 218 and its line 300 is illustrated. Such an arrangement has the advantage that a user may add the ARTOHC feature to an existing telephone set 218 without buying a completely new telephone set such as 218'.

As with FIG. 4, in FIG. 5 similar numbers denote similar elements. The operation of ARTOHC circuit 100" is essentially the same as the operation of ARTOHC circuit 100 shown in FIG. 1 and described above. The difference being that ARTOHC circuit 100" is a separate external apparatus which connects to telephone set 218 via two wired line 300A. Since ARTOHC circuit 100" is external to telephone set 218, the user setting sequence can only be entered from keypad 200 while hook-switch 202 is in the off-hook position, otherwise the keypad 200 is disconnected from line 300A. Further, because ARTOHC circuit 100" is only connected to telephone set 218 with the normal two wire line and no special connections, a sensor is needed to determine when the hook-switch 202 is in an on-hook position in order to switch ARTOHC switch 122" back to the normally closed position to connect telephone set 218 to line 300 for normal operation. Sensor 400 is preferably an impedance sensor since that does not require any electrical or mechanical connections to telephone set 218 beyond line 300A. Sensor 400 may measure dc impedance or ac impedance since both have differences from the off-hook and the on-hook positions. Sensor 400 will sense when hook-switch 202 goes off-hook and provides an enable signal via line 122" to timer controller 102" to start counting down the set time period. Similarly sensor 400 will sense when hook-switch 202 goes to the on-hook position and sends a reset signal via line 124" to cause the timer controller 102' to reset the timer 108' at the completion of a call. ARTOHC circuit 100" may also have an auxiliary ringer 410, which is equivalent to the ringer circuit 210, that is connected to line 300 whenever ARTOHC switch 122 is in the ARTOHC position. Auxiliary ringer 410 is desirable because ringer 210 is disconnected when hook-switch 202 is inadvertently left off-hook. Preferably, auxiliary ringer 410 will have a different sound than ringer 210 in order to alert the user that a hang-up of the handset or a hook-flash is needed to recycle ARTOHC circuit 100" and receive the incoming call.

Figure 6:
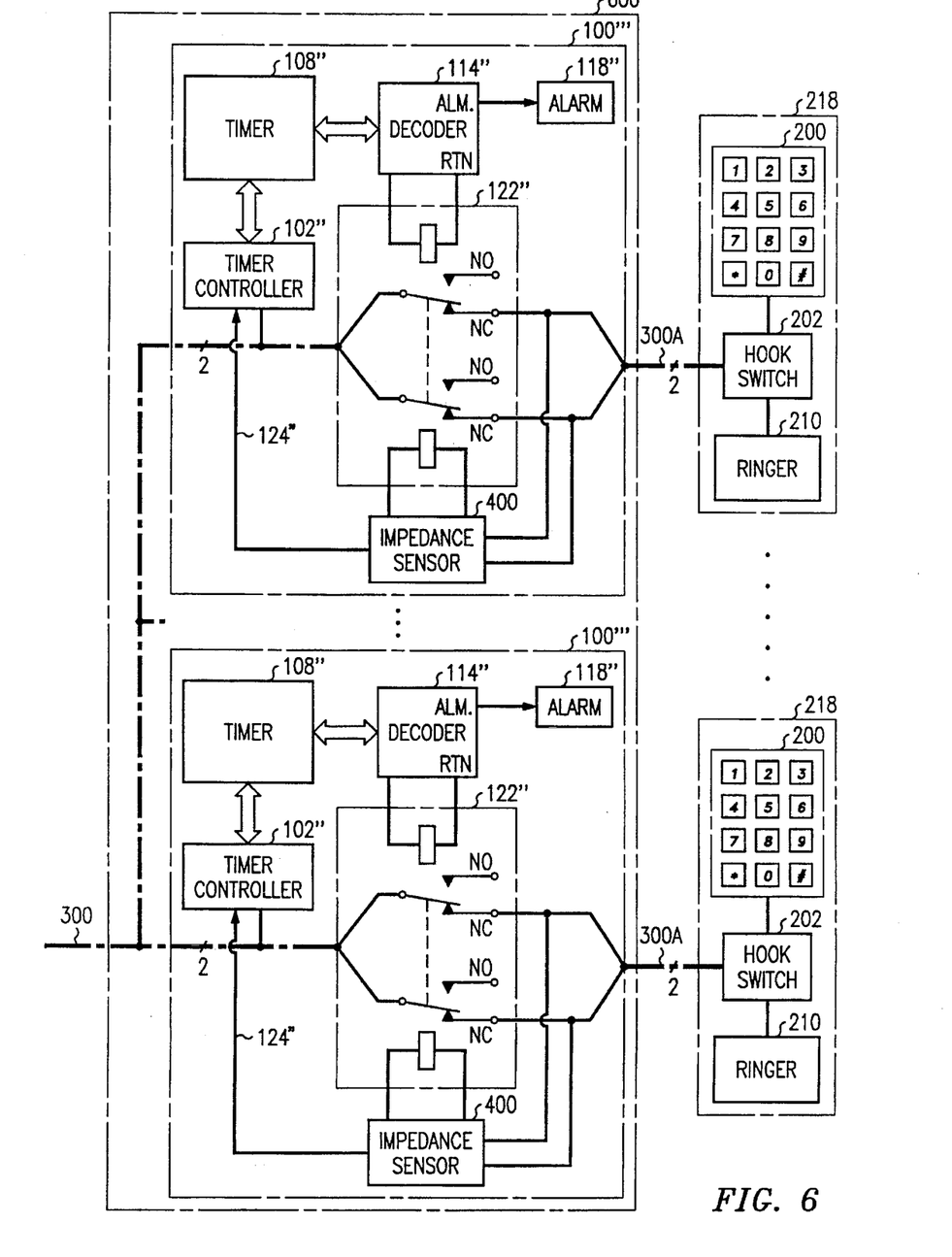
FIG. 6 is a simplified schematic diagram of an external-all-extensions embodiment of the present invention.

Referring now to FIG. 6, an all extensions embodiment of the present invention is shown. This embodiment has ARTOHC unit 600 connecting to telephone line 300 and multiple lines 300A. ARTOHC unit 600 contains multiple ARTOHC circuits 100'''. Each of the ARTOHC circuits 100''' is essentially the same as ARTOHC circuit 100" shown in FIG. 5 except that auxiliary ringer 410 is not necessary. ARTOHC unit 600 typically will be located far away from each of the telephone sets 218 that it monitors, that is why auxiliary ringers 410 are not necessary. Additionally, because of the location of ARTOHC unit 600 far away from the telephones 218, the audio warning that the time period is almost up before an automatic-return-to-an-on-hook-condition occurs is preferable for this embodiment. ARTOHC unit 600 takes advantage of one package for providing ARTOHC service to multiple existing telephones 218. Further, ARTOHC unit 600 typically will be located outside the user's living space where it will be out of the way and less likely to be accidentally damaged.

In operation, for all embodiments of the invention, each of the timer controllers 102–102''' may have a default setting (such as two hours), as well as a timer turn-off code (such as #000, or ####). The default setting and the timer turn off code could be in either hard wired logic within each timer controller 102–102''', or in a small ROM area, if a digital controller is used.

Since each of the timer controllers 102–102''' is responsive to dialing signals, DTMF or pulse dialed, when the hook-switch is in the off-hook position, each of the timer controllers 102–102''' may be pre-programmed to accept a return-to-an-on-hook-condition command. This command typically would come from the local telecommunication switch and would be pre-determined string of DTMF or pulse signals. A local telecommunications switch using this command could order a user's ARTOHC apparatus that is equipped with this feature to return-to-an-on-hook-condition. Alternatively, since each of the timer controllers 102–102''' is responsive to DTMF or dial pulses to re-set their respective timers, the local telecommunication switch 122–122''' could transmit DTMF or dialing pulses specifically to reset the time period of an ARTOHC apparatus 100–100''' to a low value, such as 30 seconds and have the inadvertently off-hook telephone returned to an on-hook condition quickly. To provide the user control the ability of local telecommunication switch to reset the time period of an ARTOHC switch to 122–122''', a disable code may also be entered from a keypad 200–200'''.

Thus, it will now be understood that there has been disclosed an apparatus that automatically returns a telephone to an on-hook condition after a user set period of time to prevent an inadvertent off-hook from rendering all extensions inoperable. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. An apparatus for connection to a local telecommunication switch via a telephone line, comprising:

a timer;

a controller connected to the timer for setting a time period to be timed out by the timer;

a hook-switch having a terminal that is connected to the timer, the terminal changes state if the hook-switch goes to an off-hook position and enables the timer to begin timing out the time period;

a decoder connected to the timer to decode an output of the timer to determine that the time period has been timed out, the decoder having an output terminal that changes state when the time period has been timed out;

an automatic-return-to-an-on-hook-condition switch having switched terminals which are connected in series between the telephone line and the hook-switch, the automatic-return-to-an-on-hook-condition switch also has a control terminal which is connected to the decoder output, if the time period has been timed out, the decoder output controls the automatic-return-to-an-on-hook-condition switch to disconnect the hook-switch from the telephone line; and a user input device connected to said controller for setting the time period.

2. The apparatus of claim 1 wherein the user input device connected to said controller for setting the time period is a key pad having a plurality of keys.

3. The apparatus of claim 2, wherein each key of said plurality of keys corresponds to a different period of time.

* * * * *